(12) United States Patent
Laumer

(10) Patent No.: US 8,770,957 B2
(45) Date of Patent: Jul. 8, 2014

(54) BLOW MOULDING MACHINE, METHOD OF EXCHANGING BLOW MOULDING STATION COMPONENTS AND BEVERAGE FILLING PLANT AND/OR BEVERAGE CONTAINER PRODUCTION PLANT

(75) Inventor: Roland Laumer, Regensburg (DE)

(73) Assignee: Krones AG (DE)

( * ) Notice: Subject to any disclaimer, the term of this patent is extended or adjusted under 35 U.S.C. 154(b) by 81 days.

(21) Appl. No.: 13/563,476

(22) Filed: Jul. 31, 2012

(65) Prior Publication Data

US 2013/0040009 A1 Feb. 14, 2013

(30) Foreign Application Priority Data

Aug. 11, 2011 (DE) .......................... 10 2011 052 574

(51) Int. Cl.
*B29C 49/36* (2006.01)
*B29C 49/46* (2006.01)
*B29C 33/30* (2006.01)

(52) U.S. Cl.
USPC ............ 425/73; 29/401.1; 425/186; 425/195; 425/522; 425/540

(58) Field of Classification Search
CPC .. B29C 31/006; B29C 33/305; B29C 33/306; B29C 33/72; B29C 2049/4858
USPC ........... 425/73, 186, 195, 225, 226, 522, 540; 29/401.1
See application file for complete search history.

(56) References Cited

U.S. PATENT DOCUMENTS

| 8,197,245 | B2* | 6/2012 | Dordoni ..................... 425/540 |
| 8,491,293 | B2* | 7/2013 | Meinzinger et al. .......... 425/186 |
| 8,505,268 | B2* | 8/2013 | Stoiber et al. ..................... 53/55 |
| 2005/0188651 | A1* | 9/2005 | Clusserath .................. 53/136.1 |
| 2007/0220835 | A1* | 9/2007 | Till ................................. 53/471 |
| 2010/0089009 | A1* | 4/2010 | Till ................................. 53/452 |
| 2011/0061690 | A1* | 3/2011 | Seger ............................. 134/137 |
| 2012/0126461 | A1* | 5/2012 | Duclos et al. ................. 425/182 |
| 2013/0211575 | A1* | 8/2013 | Hahn, Wolfgang ........... 700/179 |

FOREIGN PATENT DOCUMENTS

| DE | 10 2008 038 141 | 2/2010 | ............. B29C 49/46 |
| DE | 10 2009 040 978 | 3/2011 | ............. B65G 1/12 |
| EP | 0602487 | 6/1994 | ............. B23P 19/04 |
| EP | 2246176 | 11/2010 | ............. B29C 49/46 |
| EP | 2319678 | 5/2011 | ............. A61L 2/20 |
| EP | 2388127 | 11/2011 | ............. B29C 49/12 |
| EP | 2388129 | 11/2011 | ............. B29C 49/46 |

OTHER PUBLICATIONS

German Search Report issued Apr. 30, 2012 in German Patent Appln. Serial No. 10 2011 052 574.2 (5 pages).

* cited by examiner

Primary Examiner — Robert B Davis
(74) Attorney, Agent, or Firm — Hayes Soloway P.C.

(57) ABSTRACT

A blow molding machine for shaping plastics material preforms into plastics material containers, has a plurality of blow molding stations with blow mold carriers for holding blow molds, including a clean room for arranging or conveying the blow molding stations under aseptic conditions and having an installation access to the clean room for installing the blow mold carriers with blow molding station components. The installation access includes at least one sterile room which is positioned in front of the clean room with the plurality of blow molding stations on the environment side.

14 Claims, 3 Drawing Sheets

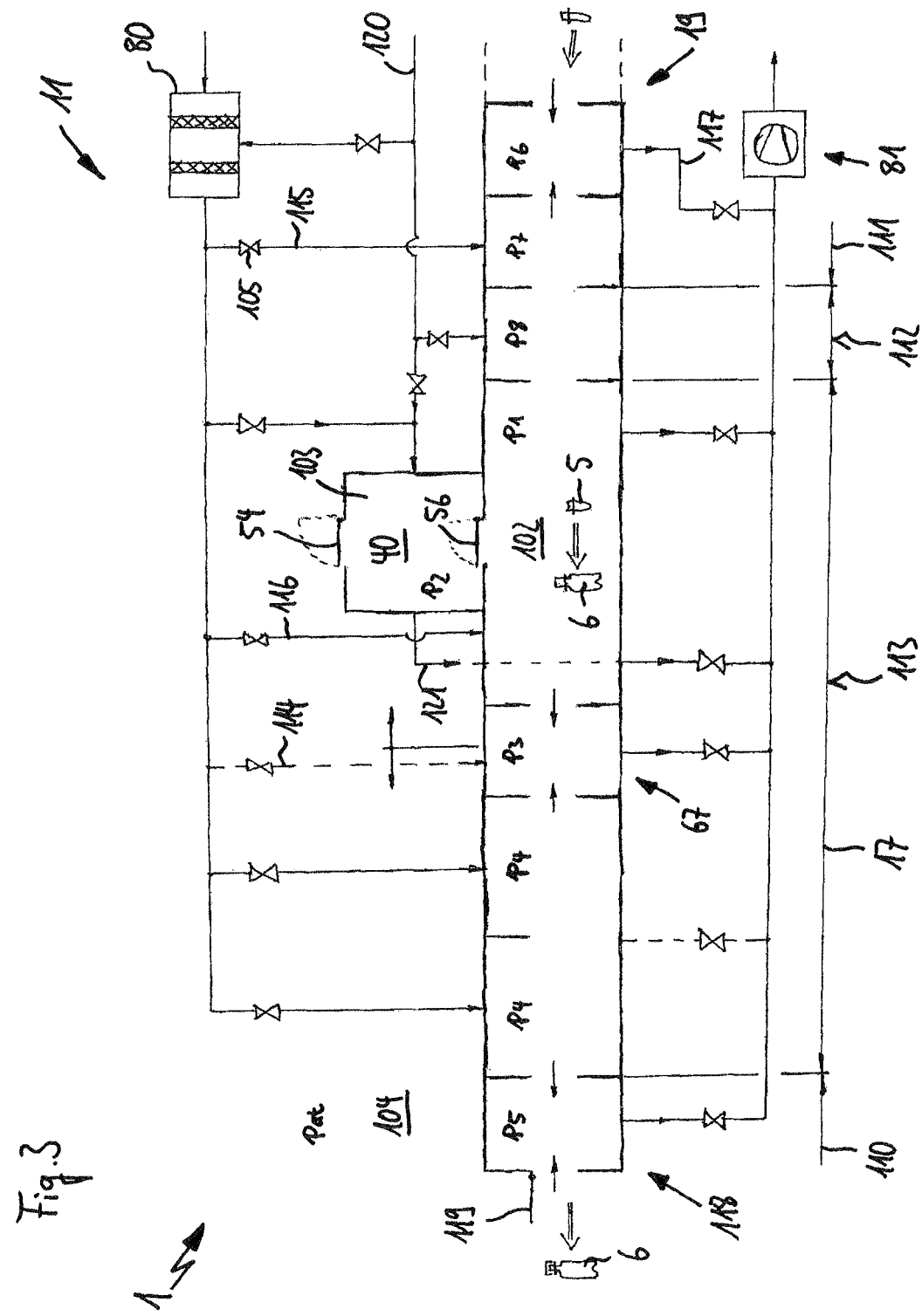

BLOW MOULDING MACHINE, METHOD OF EXCHANGING BLOW MOULDING STATION COMPONENTS AND BEVERAGE FILLING PLANT AND/OR BEVERAGE CONTAINER PRODUCTION PLANT

BACKGROUND OF THE INVENTION

The invention relates to a blow moulding machine for shaping plastics material pre-forms into plastics material containers, comprising a plurality of blow moulding stations with blow mould carriers for holding blow moulds, comprising a clean room for arranging or conveying the blow moulding stations under aseptic conditions and comprising an installation access to the clean room for installing the blow mould carriers with the blow moulding station components.

The invention also relates to a method of exchanging components of a blow moulding station in a clean room of a blow moulding machine, in which the clean room is opened and in which the blow moulding station components are exchanged.

In addition, the invention relates to both a beverage filling plant and a beverage container production plant.

Generic blow moulding machines, in particular stretch blow moulding machines, beverage filling plants and/or beverage container production plants are well known from the prior art.

By way of example, the Offenlegungsschrift (Laid-Open specification) DE 10 2008 038 141 A1 discloses a plant for the production of plastics material containers with a clean room in which the plastics material containers are both produced and filled with beverages. In this respect the production plant comprises an apparatus for shaping plastics material pre-forms into the plastics material containers and a filling device for the latter. The shaping apparatus has a plurality of blow moulding stations with blow mould carriers for holding blow moulds, in which the plastics material pre-forms are expanded to form the plastics material containers. The subject matter of DE 10 2008 038 141 A1 is hereby made the content of the disclosure of the present application by reference in its entirety. It is to be understood that in order to produce plastics material containers of different design, for example with respect to a volume and/or a contour, it is also necessary for different blow moulds to be used on the shaping apparatus. A corresponding exchange is carried out manually on the shaping apparatus in this case in that a first blow mould set with blow moulds of a first type is exchanged for a further blow mould set with blow moulds of a second type. After the exchange, it is necessary to sterilize not only the new blow moulds inside the clean room in order to prevent contamination of the plastics material pre-forms or the plastics material containers respectively with germs, but also the previously opened clean room itself.

In order to facilitate an exchange of the blow moulds, it is known to keep a set of blow moulds to be exchanged in a mobile magazine apparatus in which the blow moulds are received individually on receiving means of a carrier device. In this case a transfer of the individual blow moulds between a blow moulding station of a shaping apparatus and the magazine apparatus can be carried out manually or at least in a semi-automated manner. Some mobile magazine apparatus can have in this case a cleaning device, by means of which the blow moulds can be rinsed, brushed, polished, disinfected and/or sterilized for example at the same time.

As a result, although blow moulds which are already sterilized and therefore ready for use immediately can be produced, there is always nevertheless a risk that the clean room will be contaminated during the opening and so a sterilization of the clean room and the devices, tools etc. present in it will necessarily have to be carried out after the exchange of the new blow moulds. This, however, leads to a considerable delay in the production.

SUMMARY OF THE INVENTION

The object of the invention is further to develop generic plants, in particular generic stretch blow moulding machines, in such a way that the risk of contamination of the clean room and the devices and tools present in it with germs is eliminated.

This object is attained on the one hand by a blow moulding machine for shaping plastics material pre-forms into plastics material containers, comprising at least one and preferably a plurality of blow moulding stations with blow mould carriers for holding blow moulds, comprising a clean room for arranging or respectively conveying the blow moulding stations under aseptic conditions and comprising an installation access to the clean room for installing the blow mould carriers with blow moulding station components, in which the installation access comprises at least one sterile room which is positioned in front of the clean room with the plurality of blow moulding stations on the environment side.

According to the invention, as well as the actual clean room in which the treatment, i.e. in particular the production and/or the filling, of the plastics material containers is carried out, a further sterile room is present through which an exchange of the blow moulds at an installation access of the blow moulding machine under sterile or aseptic conditions is made possible. By means of this novel installation access the actual clean room of the blow moulding machine can be opened without risk in order to exchange a set of blow moulds, without either the clean room or devices present in it, such as for example blow moulding tools, being contaminated in this case by germs from the environment.

The present invention is advantageous particularly in the beverage industry, since in particular plastics material beverage bottles and beverages to be filled into them, which are highly susceptible to germs, are frequently processed there. The object of the invention is therefore also attained on the other hand by a beverage filling plant and/or a beverage container production plant which is characterized by the present blow moulding machine.

It is possible, in addition, for an installation access with an additional sterile room of this type to be capable of being used with advantage on a beverage filling plant or on a beverage container production plant respectively in a multiplicity of regions or treatment machines. By way of example, on a filling machine or on a rinsing machine for changing CIP caps, in a closing machine for changing crown stoppers, in a cleaning or sterilization machine with nozzles dependent upon the containers and also in general for changing format parts in container-conveying units.

In this case, in the sense of the invention, the term "clean room" describes a process room in a processing line of the blow moulding machine, in which the plastics material containers are treated under sterile conditions in a manner dependent upon the process.

In the sense of the invention, the term "sterile room" describes a region of the blow moulding machine through which components associated with the machine can be moved under sterile conditions into the clean room or can be removed out of the latter.

It is preferable for the clean room to be capable of being connected to the sterile room in terms of flow. It is advantageous for a flow connection between the clean room and the sterile room to be capable of being interrupted.

The expression "blow moulding machine" also covers, in particular, a stretch blow moulding machine.

In an advantageous manner the blow moulding station components can embrace in particular blow moulds, floor moulds, stretch bars, stretch bar stops, holding clamps, gripping clamps, blow moulding nozzles or the like.

A preferred variant of embodiment provides that the installation access comprises an environment lock for access to the sterile room on the one hand and an exchange lock for separating the blow moulding station components into and out of the clean room on the other hand. As a result, access to the sterile room can take place without difficulty, without the risk of contamination of the clean room.

In this case the sterile room can advantageously be equipped with blow moulding station components, whilst it is still separated from the clean room. If an equipping of the sterile room is carried out and the environment lock is closed again, a sterilization of the sterile room and the blow moulding station components arranged in it can be carried out. After that, the exchange lock and thus the clean room can be opened without risk.

In this respect the object of the invention is also attained by a method of exchanging components of a blow moulding station in a clean room of a blow moulding machine, in which the clean room is opened and in which the blow moulding station components are exchanged in particular in the opened clean room, the blow moulding station components being exchanged under sterile conditions.

It is advantageous for the blow moulding station components to be exchanged in a sterile room or through a sterile room in a sterile environment, since installation times can be considerably reduced as a result.

If the environment lock and the exchange lock are directly opposite each other, the installation access can have a very compact design, since, in particular, blow moulds can be separated out in an opposed manner through the installation access.

It is possible for a sterile room of the installation access to be capable of being formed in the same way by a suitably designed housing of a clean room.

If the installation access has a housing which envelops the sterile room and which is arranged in a releasable manner on a wall of the clean room, it is also possible in an advantageous manner for conventional or already constructed blow moulding machines to be retrofitted in a simple manner.

In particular, an installation access releasable in this way with the housing enveloping the sterile room can also advantageously be re-positioned or arranged temporarily in different regions of a beverage container treatment plant, namely where a corresponding installation procedure is currently to be carried out under sterile conditions.

A particularly preferred variant of embodiment thus also provides an exchange lock for separating the blow moulding station components into and out of the clean room, in which case the exchange lock comprises a separating wall—capable of being opened—of the installation access, preferably a separating wall on the side towards the sterile room and a separating wall on the side towards the clean room.

The installation access can be removed without difficulty from the wall of the clean room, for example for maintenance purposes, when the separating wall on the side towards the clean room is closed, since contamination of the clean room by germs can be eliminated. If the separating wall on the side towards the sterile room is then also closed, the risk of contamination on the side towards the sterile room can also be eliminated. In particular, this can also be advantageous when moving the present installation access.

In addition, it is advantageous for the installation access to comprise a device capable of being actuated automatically or at least semi-automatically for transferring the blow moulding station components from the sterile room into the clean room and/or vice versa. As a result, an exchange of the blow moulding station components can be accelerated, as a result of which the installation time can advantageously be reduced.

In an advantageous manner the transfer device has a gripper for gripping and transferring the blow moulding station components, by means of which for example each blow mould can be gripped. In this way, in particular, a blow mould to be exchanged can be removed from a blow mould carrier of a blow moulding station by means of the gripper and can be transferred into a free receiving means inside the installation access. After that, a new blow mould can be taken out of a further receiving means of the installation access and can be transferred to the blow mould carrier emptied beforehand. This procedure can be continued until the complete set of blow moulds is exchanged.

It is to be understood that an exchange of this type can also be carried out manually or by means of aids designed in a different manner.

In addition, it is advantageous for the installation access to comprise a blow moulding station component holding device which is preferably capable of being rotated, so that an installation procedure, in particular of a complete set of blow moulds, can be carried out in a rapid and simple manner. It is possible for holding devices designed in different ways also to be used. In order that a coordination between the individual devices, such as for example the exchange lock, the preferably rotatable blow moulding station component holding device, a blow mould wheel on the side towards the clean room and the transfer device, can be automated, it is advantageous for a control apparatus, by means of which the corresponding operational sequences can be carried out in an automated manner at least in part, to be provided for this purpose.

In addition, it is advantageous for the installation access to comprise a sterile gas supply which has a connection to a sterile gas preparation means for the clean room. In this way, a sterilization can be carried out in a simple manner structurally at the installation access.

In order to prevent the risk of contamination of the clean room and the sterile room in an equally highly satisfactory manner, it is particularly advantageous for a clean room working air pressure to be higher than a sterile room working air pressure of the installation supply and for the sterile room working air pressure to be higher than the atmosphere air pressure. As a result, it is possible on the one hand to reduce the risk of an air exchange from the sterile room into the clean room being able to take place. On the other hand, an air exchange from the environment outside the stretch blow moulding machine into the sterile room can thus be satisfactorily prevented.

In this respect an installation access with an advantageous two-stage compressed-air barrier is provided in the present case. Solely as a result of this, a blow moulding machine with a clean room, in particular a stretch blow moulding machine, can be advantageously further developed even without the other features of the invention.

BRIEF DESCRIPTION OF THE DRAWINGS

Further advantages, aims and properties of the present invention are explained with reference to the accompanying drawing and the following description, in which a beverage container treatment plant with a stretch blow moulding machine comprising at least one installation access according to the invention is illustrated and described by way of example. In the drawing

FIG. 3 is a diagrammatic view of an aeration plant of the beverage treatment plant as shown in FIGS. 1 and 2.

DETAILED DESCRIPTION OF THE INVENTION

Figure 1:
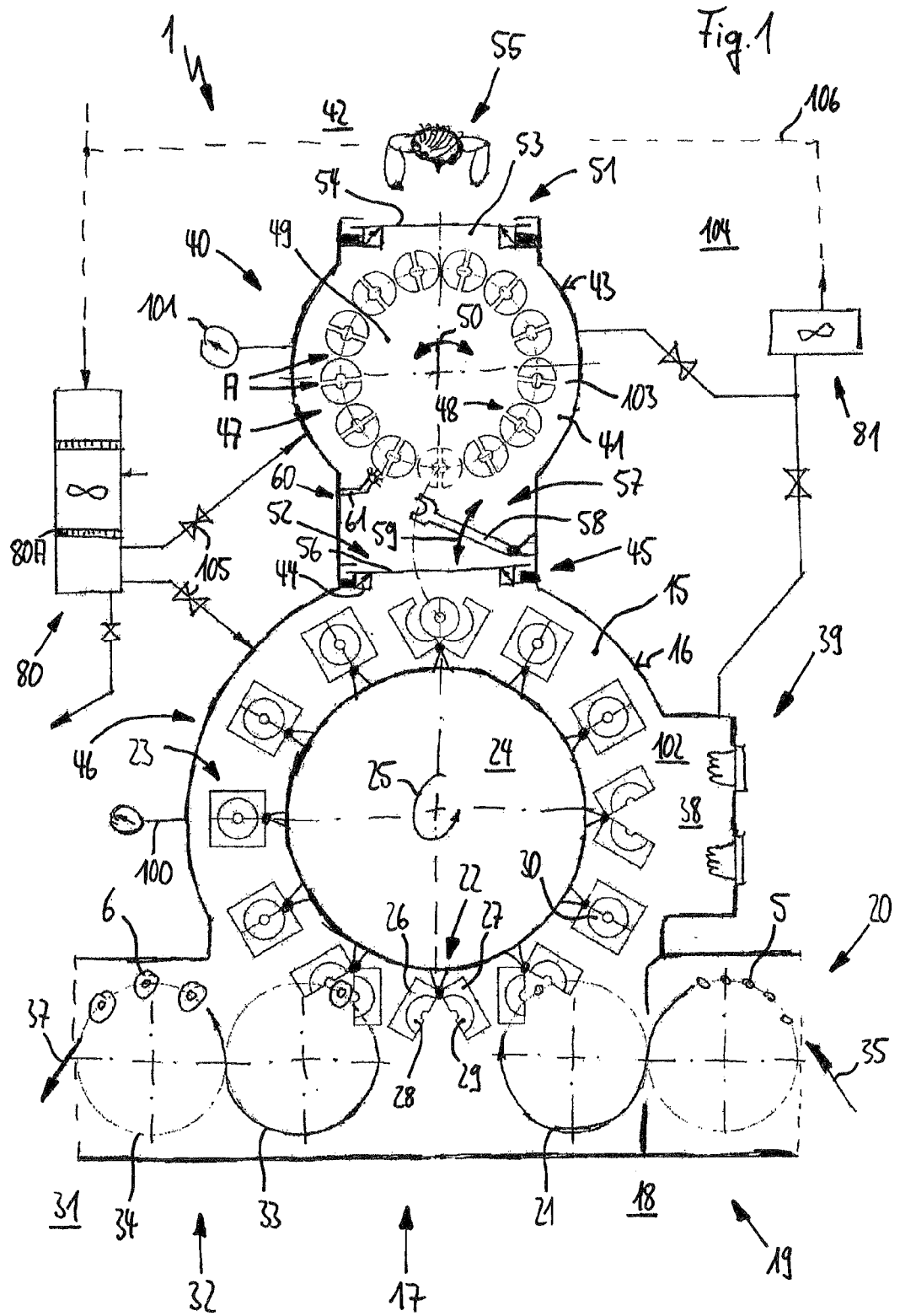
FIG. 1 is a diagrammatic view of a stretch blow moulding machine of a beverage container treatment plant with at least one installation access comprising a sterile room.
Figure 2:
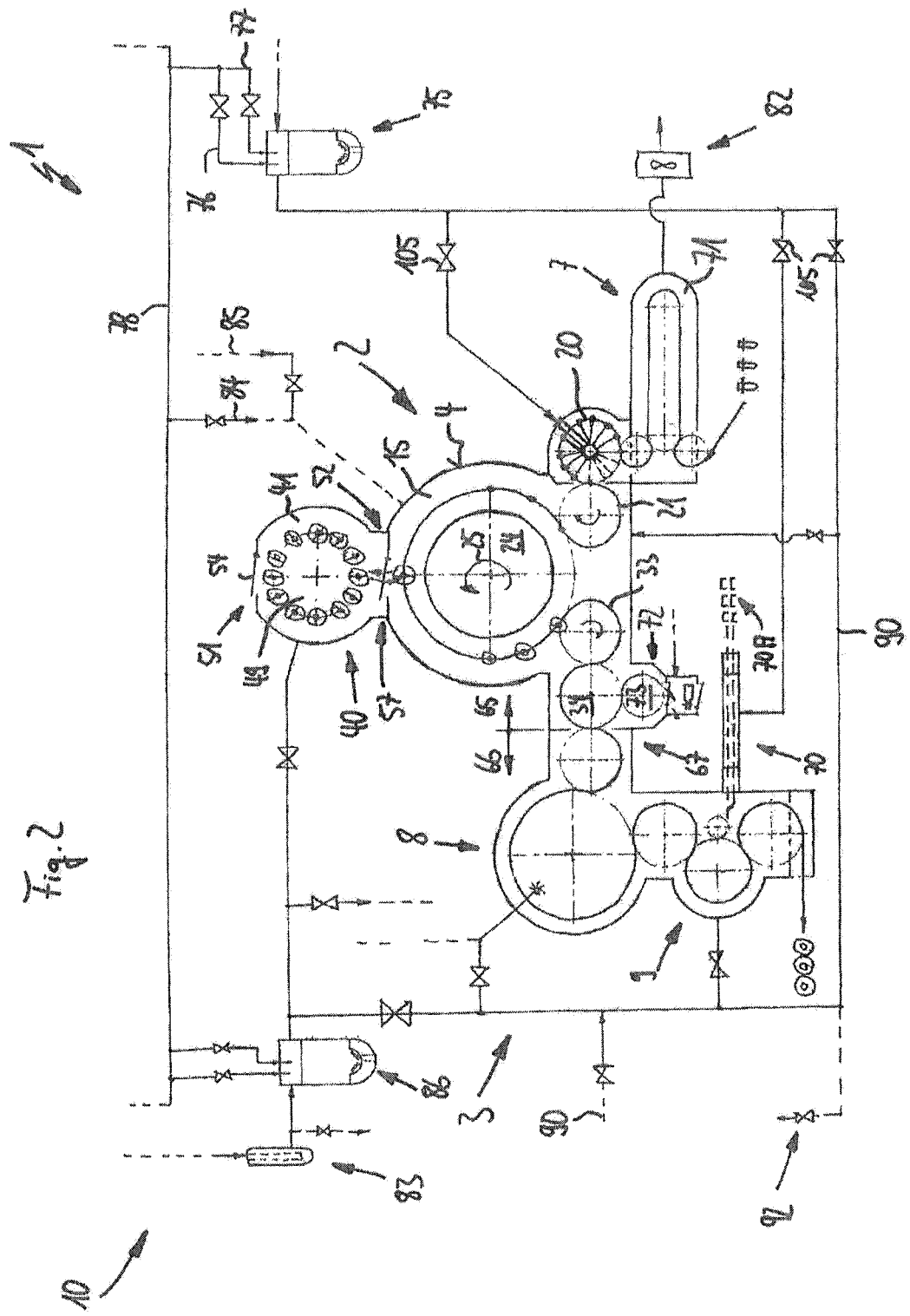
FIG. 2 is a diagrammatic view of the entire beverage container treatment plant as shown in FIG. 1.

The beverage container treatment plant 1 as shown in FIGS. 1 to 3 (see in particular FIG. 2) essentially comprises a beverage container production unit 2 and a beverage filling unit 3, the beverage container production unit 2 being characterized mainly by a blow moulding machine which in this embodiment is designed in the form of a stretch blow moulding machine 4 for shaping plastics material pre-forms 5 into plastics material beverage bottles 6, and a heating apparatus 7 arranged upstream and the beverage filling unit 3 by a beverage filling machine 8 for filling the plastics material beverage bottles 6 produced and by a closure machine 9 for closing the filled plastics material beverage bottles 6.

In addition, the beverage container treatment plant 1 also has a central sterilization apparatus 10 (see in particular FIG. 2) and a central aeration apparatus 11 (see in particular FIG. 3) for filtering untreated air and for supplying the beverage container treatment plant 1 with sterile clean air.

The stretch blow moulding machine 4 shown in greater detail in FIG. 1 has a clean room 15 which overlaps the beverage container treatment plant 1 and which formulates a sterilizable clean room region 17 of the beverage container treatment line 1 by means of a clean room wall 16.

The stretch blow moulding machine 4 has at the side towards the inlet 18 a plastics material pre-form supply 19 with a sterilization wheel 20 for the plastics material pre-forms 5 and with a first transfer wheel 21, by means of which the plastics material pre-forms 5 are individually transferred in succession in each case to a blow mould carrier 22 of a blow moulding station 23 on a blow moulding wheel 24 with a direction of rotation 25.

Each of the blow mould carriers 22 comprises a first blow mould carrier half 26 and a second blow mould carrier half 27 on which a first blow mould half 28 and a second blow mould half 29 of a blow mould 30 are held. The blow mould carrier halves 28 and 29 can thus be opened and closed in a known manner.

At the side towards the outlet 31 the stretch blow moulding machine 4 has a plastics material beverage bottle removal means 32 with a second transfer wheel 33 and a third transfer wheel 34, by means of which the finished blow moulded plastics material beverage bottles 6 are removed out of the blow moulding stations 23 on the one hand and are removed from the stretch blow moulding machine 4 on the other hand.

On the stretch blow moulding machine 4 the plastics material pre-forms 5 are transferred to the sterilization wheel 20 in the supply transportation direction 35. After the sterilization of the plastics material pre-forms 5 and the equipping of the individual blow moulding stations 23 the plastics material pre-forms 5 are expanded in the individual blow moulds 30 by means of process air to form the plastics material beverage bottles 6, before they are finally supplied to the beverage filling unit 3 in the removal transportation direction at the side towards the outlet 31 on the stretch blow moulding machine 4 for further use.

In a servicing area 38 of the stretch blow moulding machine 4 a servicing intervention 39 for manual engagement in the clean room 15 with respect to maintenance or an error correction or the like is provided on the clean room wall 16.

In addition, the stretch blow moulding machine 4 is provided with an installation access 40, by way of which the blow moulding stations 23 can be equipped with different blow moulds 30. According to the invention the installation access 40 comprises a sterile room 41 which is positioned in front of the clean room 15 on the side towards the environment 42.

In this case the sterile room 41 is enclosed by a housing 43, the housing 43 being attached in a releasable manner in this embodiment to the clean room wall 16 by means of a closure device 45 comprising sealing means 44.

In particular, by means of the present installation access 40 which comprises the sterile room 41, it is possible in an advantageous manner to keep—in addition to a first blow mould set 46 comprising the blow moulds 30 inside the clean room 15—a further, already sterile blow mould set 47 comprising other blow moulds 48 outside the clean room 15 on the stretch blow moulding machine 4 under sterile conditions, so that switching the stretch blow moulding machine 4 over to another type of plastic material beverage bottle can be carried out more rapidly than hitherto.

In order to keep the further blow mould set 47 the installation access 40 comprises a rotatable blow mould holding device 49 which can be moved inside the sterile room 41 in accordance with the movement directions of the arrow 50.

In addition, the installation access 40 has an environment lock 51 for access to the sterile room 41 from the side towards the environment 42 on the one hand and an exchange lock 52 for separating the blow moulds 30, 48 into or out of the clean room 15 on the other hand.

The environment lock 51 has an equipping opening 53 with an environment lock door 54. An operator 55 can introduce or remove the blow moulds 30 and 48 respectively into the sterile room 41 by way of the equipping opening 53. A mobile blow mould magazine (not shown here) can optionally be attached to the equipping opening 53 in order further to facilitate an exchange of the blow moulds 30 and 48 respectively.

In this embodiment the exchange lock 52 has only a single exchange lock door 56, by means of which the sterile room 41 can be separated hermetically from the clean room 15. Two exchange lock doors of this type are advantageous when the installation access 40 is temporarily removed from the clean room wall 16, so that both the sterile room 41 and the clean room 15 are closed.

In addition, the installation access 40 comprises an automated transfer device 57 of hygienic design for the transfer of the blow moulds 30 and 48 respectively between the sterile room 41 and the clean room 15. To this end the automated transfer device 57 has a gripper 58 for treating the individual blow moulds 30 and 48 respectively. The gripper 58 is mounted in the installation access 40 so as to be pivotable along the pivoting directions 59.

In the event of a change of the blow moulds the exchange lock door 56 is opened. That blow mould carrier 22 of the corresponding blow moulding station 23 which is directly opposite the exchange lock 52 is also opened. The movable exchange lock door 56 and the blow mould carrier 22 are advantageously actuated in an automated manner. A manual operation is also possible, however, which can be carried out for example by way of the servicing intervention 39. When the exchange lock door 56 is opened the transfer device 57 of hygienic design changes the sets 46 and 47 of blow moulds.

In general the gripper 58 and the exchange lock 52 can also be used to bring articles into the clean room 15 or to remove for example defectively formed plastics material beverage bottles 6 from the clean room 15.

The installation access 40 can also be present more than once in an identical or similar design in particular in the region of the blow moulding wheel 24. Depending upon the size of the plant or machines and the requirement the arrangement the setting and position can be selected in an advantageous manner.

A sterile gas supply 60 with at least one cleaning nozzle 61 is additionally provided in order to sterilize the individual blow moulds 48 inside the installation access 40. In this case each of the blow moulds 48 arranged in the sterile room 41 can be temporarily parked in front of the cleaning nozzle 61 and cleaned.

It is preferable for the clean room 15 to be sterilized with a tempered gas mixture of $H_2O_2$ and air. Cleaning is not absolutely necessary before each sterilization.

It is also advantageous for the installation access 40 to be sterilized with gas. This is necessary if for example a non-sterile set of blow moulds 48 is introduced into the sterile room 41 by the operator 55. In this way, the blow moulds 48 can be installed during the production of the plastics material beverage bottles 6 and can respectively be cleaned and sterilized by means of one or more cleaning nozzles 61. In this case it is advantageous for the various blow moulds 48 to be positioned at a distance A, in order to wet all the surfaces satisfactorily.

As may be seen particularly clearly from the illustration of FIG. 2, the beverage container treatment plant 1 is divided into a region 65 which is capable of being sterilized and a region 66 which is capable of being cleaned and sterilized.

The region 65 capable of being sterilized starts after the sterilization of the plastics material pre-forms 5 on the sterilization wheel 20 and ends at a transfer unit 67 between the stretch blow moulding machine 4 and the beverage filling machine 8 of the beverage filling unit 3.

The region 66 capable of being cleaned and sterilized starts immediately after the region 65 capable of being sterilized and ends after the application of closures to the plastics material beverage bottles 6 on the closure machine 9 with a closure sterilization unit 70 for closures 70A. In particular, it is advantageous for the other blow moulds 48 to be cleaned in an automated manner in the installation access 40. It is preferable for the beverage container treatment plant 1 as a whole to be dry-sterilized.

In addition, the beverage container treatment plant 1 comprises a furnace 71 associated with the heating device 7 for heating the plastics material pre-forms 5 and an additional plastics material beverage bottle lock 72.

During the production an evaporator 75 known per se supplies the sterilization wheel 20 of the plastics material pre-forms 5 and/or the closure sterilization unit 70. In order to produce a multiplicity of necessary quantities for different operating states of $H_2O_2$ air mixture, the evaporator 75 is supplied from an annular $H_2O_2$ line 78 by way of two or more paths 76 and 77.

The air supply can come either from the environment 42 and/or from an aeration system 80 with a filter 80A and 81 respectively (see FIGS. 1 and 3) of the beverage container treatment plant 1 and/or from the waste air appliance 82 of the furnace 71. Absolute security with respect to purity is provided by a cartridge filter element 83 in the supply line of the incoming air.

The annular $H_2O_2$ line 78 can have further consumer means 84 in order to supply further units of the beverage container treatment plant 1. By way of example, hydraulic sealing systems can be supplied together with a water connection 85.

Since the evaporator 75 should not be adversely affected during the production, it is advantageous for the further set of blow moulds 47 to be capable of being sterilized by way of a further evaporator 86, since this process should be planned for a time during the production.

Furthermore, the additional plastics material beverage bottle lock 72 can also be sterilized at least for a time by means of the second evaporator 86 by way of a line.

By way of example, defective plastics material beverage bottles 6 or sample containers (not shown here) can be removed by way of the additional plastics material beverage bottle lock 72 from the current process or disposed of by way of a transfer wheel 73. After the production the region 66 capable of being cleaned and sterilized is preferably cleaned in an automatic manner with caustic solution by way of one or more injection nozzles and/or rotation heads (not shown here) and then rinsed with water, preferably of the quality of drinking water.

After that, the region 66 capable of being cleaned and sterilized should be additionally dried. The beverage container treatment plant 1 can then be put into a state of rest.

The various components of the beverage container treatment plant 1 have to be sterilized before the next production. To this end they have to be heated. It is advantageous for tempered air 90 to be fed into a pipe line system 91.

After that, the beverage container treatment plant 1 is dry-sterilized, preferably with $H_2O_2$. The two evaporators 75 and 86 can feed into the pipe line system 91 and, in this way, can accelerate the process. In addition, $H_2O_2$ can also be branched off from the pipe line system 91 at a connection 92, in order for example to sterilize the first aeration system 80 and/or a further pipe line system, such as for example a nozzle system for cleaning the beverage container treatment plant 1 and/or also units extraneous to the plant.

The clean room 15 and the sterile room 41 are acted upon with filtered air, so as to ensure an over-pressure with respect to the surrounding atmosphere. In the present case the over-pressure is monitored by a control means (not shown here) of the machine by means of one or more pressure sensors 100 and 101.

A particularly successful production of plastics material beverage bottles is ensured for example by the following pressure ratio: $p_1 > p_2 > p_{at}$ in which in the present case $p_1$ is the working air pressure 102 of the clean room, $p_2$ is the working pressure 103 of the sterile room and $p_{at}$ is the air pressure 104 of the atmosphere. In order to be able to reduce the risk of contamination by germs still further, in particular in the region of the stretch blow moulding machine 4, the working air pressure 102 of the clean room is set higher than the sterile room working air pressure 103 of the installation supply 40 and the sterile room working air pressure 103 is set higher than the atmosphere air pressure 104.

It is advantageous for sterile incoming air to be prepared by way of a central aeration system 80 and 81 respectively and to be supplied to the various portions of the clean room by way of pipe lines. The control of the air flows is carried out as a rule by poppet valves or flap valves 105 (numbered only by way of example).

An air extraction system is where appropriate also necessary with respect to the second aeration system 81 if a directed flow is desired. Part of the air can also be moved in a circuit 106. The aeration system can also supply other clean rooms of machines, such as the beverage filling machine 8, the closure machine 9 or on the other hand even plants set up in parallel (not shown here). In general it is advantageous for the process technology to be combined with other machines of the container treatment. The aeration system 80 can also be sterilized from the rear side.

In particular, the illustration according to FIG. 3 clearly shows in a diagrammatic manner the mode of operation of the aeration technology of the present beverage container treatment plant 1 which is divided into non-sterile regions 110 and 111, into a sterilization region 112 for the sterilization of the plastics material pre-forms 5 and into a sterile region 113. The sterile region 113 starts during the sterilization of the plastics material pre-forms 5 and ends after the closure is applied to the respective plastics material beverage containers 6. This entire region has to be kept under over-pressure during the production.

In addition, there are also regions 65 and 66 which bound the filling region of the present stretch blow moulding machine 4.

It is preferable for suction to take place on the transfer unit 67 which constitutes a lock system, so that during the production no aerosols from the filling process reach the region 65 capable of being sterilized. In addition, an air supply means 114 can be attached to the transfer unit 67, so that an over-pressure can always be maintained with respect to the atmosphere. In the entire sterile region 113 the over-pressure should not drop below 5 pascal.

A lock system in the form of the plastics material pre-form supply means 19 is likewise installed on the supply side of the plastics material pre-forms 5. Since, in particular, a hot $H_2O_2$/air mixture is supplied for the sterilization of the plastics material pre-forms 5 on the sterilization wheel 20, it is necessary to have the same pressure level ($p_1 \approx p_8 \approx p_7 > p_{at}$) on both sides. That is provided by a second air supply 115 on the one hand and by a third air supply 116 on the other hand. In which case a major part of the volume flow of the second air supply 115 is drawn away by way of the air outlet 117.

An air lock 118 must likewise be present on the outlet side in order to have a clear separation between the sterile region 113 and the first non-sterile region 110.

During the sterilization of the beverage container treatment plant 1 a hot $H_2O_2$ air mixture is preferably used, as already mentioned. For this purpose, the outlet 118 is closed at least in part by a flap 119.

Concerning the introduction of articles during an interruption of production, for the sake of flexibility of the plant it is advisable for parts dependent upon the format, such as for example blow moulds 30 or 48, to be introduced into the sterile zone of the clean room 15, in particular into the stretch blow moulding machine 4, by way of an installation access 40.

In order to introduce the blow moulds 48 the environment lock door 54 must be opened, as a result of which the installation access 40 is non-sterile. After the closure of the environment lock door 54 the blow moulds 48 in the sterile room 41 of the installation access 40 are preferably sterilized with the $H_2O_2$ air mixture by way of an $H_2O_2$ air mixture supply means 120. Starting from the $H_2O_2$ air mixture supply means 120 it is also optionally possible for a plastics material pre-form sterilization or even the filters of the aeration system 80 (see FIG. 1) to be sterilized. After the sterilization of the blow moulds 48 the sterile room should be rinsed with filtered air from the aeration system 80. To this end an air outlet 121 is also necessary. Before the outlet lock door 56 is opened, the pressure between the clean room 15 and the sterile room 41 must be brought to the same level ($p_1 \approx p_2$). The new blow moulds 48 can then be introduced into the clean room 15 and existing blow moulds 30 should be removed from the clean room 15, without the sterility being adversely affected. During the production it is necessary for the following pressure states always to be provided: $p_1, p_3, p_4 > p_{at}$.

It is to be understood that the embodiment explained above is only a first design of the stretch blow moulding machine 4 according to the invention. In this respect the design of the invention is not restricted to this embodiment.

The Applicants reserve the right to claim all the features disclosed in the application documents as being essential to the invention, insofar as they are novel either individually or in combination as compared with the prior art.

LIST OF REFERENCES 1 beverage container treatment plant
2 beverage container production unit
3 beverage filling unit
4 stretch blow moulding machine
5 plastics material pre-forms
6 plastics material beverage bottles
7 heating apparatus
8 beverage filling machine
9 closure machine
10 sterilization apparatus
11 aeration apparatus
15 clean room
16 clean room wall
17 clean room region
18 inlet side
19 plastics material pre-form supply
20 sterilization wheel
21 first transfer wheel
22 blow mould carrier
23 blow moulding station
24 blow moulding wheel
25 direction of rotation
26 first blow mould carrier half
27 second blow mould carrier half
28 first blow mould half
29 second blow mould half
30 blow mould
31 outlet side
32 plastics material beverage bottle removal means
33 second transfer wheel
34 third transfer wheel
35 supply transport direction
37 removal transport direction
38 servicing area
39 servicing intervention
40 installation access
41 sterile room
42 environment side
43 housing
44 sealing means
45 closure device
46 first set of blow moulds
47 further set of blow moulds
48 other blow moulds
48A first blow mould half
49 rotatable blow mould holding device
50 arrow
51 environment lock
52 exchange lock
53 equipping opening
54 environment lock door
55 operator 56 exchange lock door
57 transfer device
58 gripper
59 pivoting directions
60 sterile gas supply
61 cleaning nozzle
65 region capable of being sterilized
66 region capable of being cleaned and sterilized
67 transfer unit
70 closure sterilization unit
70A closures
71 furnace
72 plastics material beverage bottle lock
73 transfer wheel
75 evaporator
76 first path
77 second path
78 annular $H_2O_2$ line
80 first aeration system
80A filter
81 second aeration system
82 waste air appliance
83 cartridge filter element
84 further consumer means
85 water connection
86 further evaporator
90 tempered air
91 pipe line system
92 connection
100 first pressure sensor
101 second pressure sensor
102 clean room working pressure
103 sterile room working pressure
104 atmosphere air pressure
105 poppet valves and flap valves
106 circuit
110 first non-sterile region
111 second non-sterile region
112 sterilization region
113 sterile region
114 first air supply means
115 second air supply means
116 third air supply means
117 air outlet
118 air lock
119 flap
120 $H_2O_2$ air mixture supply
121 air outlet
A distance

The invention claimed is:

1. A blow moulding machine for shaping plastics material pre-forms into plastics material containers, comprising a plurality of blow moulding stations with blow mould carriers for holding blow moulds, comprising a clean room for arranging or conveying the blow moulding stations under aseptic conditions and comprising an installation access to the clean room for installing the blow mould carriers with blow moulding station components, wherein the installation access comprises at least one sterile room which is positioned in front of the clean room with the plurality of blow moulding stations on the environment side.

2. The blow moulding machine according to claim 1, wherein the blow moulding station components embrace blow moulds, floor moulds, stretch bars, stretch bar stops, holding clamps, gripping clamps, blow moulding nozzles or the like.

3. The blow moulding machine according to claim 1, wherein the installation access comprises an environment lock for access to the sterile room on the one hand and an exchange lock for separating the blow moulding station components into and out of the clean room on the other hand.

4. The blow moulding machine according to claim 1, wherein the installation access has a housing which envelops the sterile room and which is arranged in a releasable manner on a wall of the clean room.

5. The blow moulding machine according to claim 1, characterized by an exchange lock for separating the blow moulding station components into and out of the clean room, wherein the exchange lock comprises a separating wall—capable of being opened—of the installation access, and a separating wall on the side towards the clean room.

6. The blow moulding machine according to claim 1, wherein the installation access comprises a device capable of being actuated automatically or at least semi-automatically for transferring the blow moulding station components from the sterile room into the clean room and/or vice versa.

7. The blow moulding machine according to claim 6, wherein the transfer device has a gripper for gripping and transferring the blow moulding station components.

8. The blow moulding machine according to claim 1, wherein the installation access comprises a blow moulding station component holding device.

9. The blow moulding machine according to claim 1, wherein the installation access comprises a sterile gas supply which has a connection to a gas sterilizer for the clean room.

10. The blow moulding machine according to claim 1, wherein a clean room working air pressure is higher than a sterile room working air pressure of the installation supply and the sterile room working air pressure is higher than the atmosphere air pressure.

11. A beverage filling plant and/or a beverage container production plant, characterized by a blow moulding machine according to claim 1.

12. A method of exchanging components of a blow moulding station in a clean room of a blow moulding machine, in which the clean room is opened and in which the blow moulding station components are exchanged, and wherein an installation access to the clean room for exchanging the blow moulding station components is comprised which has at least one sterile room which is positioned in front of the clean room on the environment side, wherein the blow moulding station components are exchanged in the at least one sterile room or through the at least one sterile room in a sterile environment under sterile conditions.

13. The blow moulding machine according to claim 5, wherein the separating wall is a separating wall on the side towards the sterile room.

14. The blow moulding machine according to claim 8, wherein the blow moulding station component holding device is capable of being rotated.

* * * * *